2,772,959
Patented Dec. 4, 1956

2,772,959
METHOD OF ELECTRIC FURNACE SMELTING OF SILICATE ORES

Lyall J. Lichty and Robert T. C. Rasmussen, Ottawa, Ontario, Canada, assignors to Quebec Metallurgical Industries Ltd., Ottawa, Ontario, Canada, a corporation of Canada No Drawing. Application March 12, 1954,
Serial No. 415,977

4 Claims. (Cl. 75—11)

This invention relates to a method for smelting in an electric arc furnace low-grade non-sulfide metalliferous ores containing from about 1 to 7 percent nickel and usually containing some cobalt. In some instances, these nickel ores grade into cobalt ores in which the cobalt content is several times the nickel content. The invention makes possible the production of a high grade ferroalloy, such as ferro-nickel or ferro-cobalt. More specifically, the invention relates to a method for smelting an oxidized ore having as its principal components by weight on the dry basis from about 8 to 20 percent iron present as oxide, about 30 to 50 percent silica, about 10 to 30 percent magnesia, not more than about 5 percent alumina, not more than about 4 percent calcium oxide and from about 1 to 7 percent of a metal selected from the group consisting of nickel, cobalt and mixtures thereof.

Most of the world's present supply of nickel is derived from sulfide ores contining copper values and considerable iron as sulfides along with nickel sulfide. These sulfide ores are amenable to beneficiation by ore dressing methods whereby most of the waste slag-making constituents are removed, leaving the nickel, copper and iron sulfide minerals in concentrated form. Nickel and copper are finally recovered as substantially pure metals after a series of smelting and chemical separation treatments.

Major reserves of nickel throughout the world occur as low-grade non-sulfide (oxide or silicate) deposits, generally referred to as lateritic deposits. These deposits contain from about 1 to about 7 percent nickel and may be classified in two general groups based upon their iron content. The low-iron deposits analyze about 8 to 20 percent iron, 30 to 50 percent silica and 10 to 30 percent magnesia, with little or no calcium oxide and not more than a few percent of alumina. Many of the low-iron deposits are copper-free, but some contain copper amounting to a significant percentage of the nickel content. The high-iron deposits, typified by some of the Cuban deposits are essentially iron ores containing 40 to 50 percent iron and nickel from about one to several percent. Both low-iron and high-iron deposits contain variable amounts of cobalt, ranging from 1 or 2 to 10 percent of the nickel content. In some instances, the nickel ores grade into cobalt ores in which the cobalt content is several times the nickel content. The low-iron deposits generally are earthy in character with a large proportion of minus 10 mesh material. The high-iron deposits are of both earthy and massive hard rock character. Beneficiation by ore dressing methods has proven to be ineffective for concentration of either the low-iron or high-iron types of non-sulfide nickel ore.

A major part of the world's nickel requirements is for the manufacture of stainless and other alloy steels and alloy irons. Nickel in the form of high-grade ferronickel can supply these requirements satisfactorily instead of electrolytic or ingot grade nickel metal.

Prior to the present invention attempts have been made to produce ferronickel from non-sulfide ores by direct smelting with a reducing agent and lime flux in an electric arc furnace. The principal deterrents to successful direct production of ferronickel of high grade by electric furnace smelting methods employing only enough reductant to reduce the nickel and cobalt and a desired portion of the iron contained in the ore have been (1) erosion of the magnesite furnace lining (magnesite having proved to be the most suitable ceramic refractory notwithstanding its high erosion), (2) operating difficulties, such as boiling and foaming slags and (3) low recovery of the nickel contained in the ore in a ferronickel product of a grade substantially higher than 25 percent nickel.

The present invention provides a method for smelting such non-sulfide ores in an electric arc furnace by which the above mentioned difficulties are overcome and makes possible the production of a ferronickel containing from about 35 to 50 percent nickel and less than 0.05 percent each of carbon and phosphorus and a substantially equally low content of silicon. Likewise, a corresponding high grade ferrocobalt may be produced.

The present invention is based principally upon the discoveries that the above mentioned difficulties may be overcome (1) by properly controlling the composition of the charge fed into the furnace to control the composition of the slag formed, (2) by properly controlling the electrical operating conditions and (3) by properly controlling the power input per unit of hearth area.

In the practice of the invention an intimate charge mixture is formed consisting of any suitable reducing agent or combination of reducing agents and an oxidized material or ore comprising by weight on the dry basis about 8 to 20 percent iron present as oxide, about 30 to 50 percent silica, about 10 to 30 percent magnesia, not more than about 5 percent alumina, from 0 to 0.6 precent copper, not more than about 4 percent calcium oxide and from about 1 to 7 percent of a metal present as oxide and selected from the group consisting of nickel, cobalt, copper and mixtures thereof. The ratio of silica to magnesia in the charge mixture should be between about 1.5 to 1 and about 2.5 to 1. The amount of reducing agent should be about equal to the stoichiometric amount required to reduce all of the above mentioned metal present as oxide and a desired amount of iron present as oxide. If necessary, a flux, such as magnesia or silica, may be added to the charge mixture to bring the ratio of silica to magnesia therein within the above mentioned range. The amount of calcium oxide in the charge mixture should be as low as possible and, consequently, any added flux should be substantially free of lime. This charge mixture is fed into an electric arc furnace having at least two electrodes in any conventional manner. Usually, it is preferable to feed the charge mixture into the furnace to form a bank on the furnace wall sloping downward toward an electrode and out of contact with the electrode. Although not essential, it is preferable to provide the furnace with a magnesite lining. The heat for smelting is supplied by electric arc resistance.

The relationship between power input and hearth area within the refractory lining for any furnace of a given size is vital to satisfactory operation without a refractory lining erosion problem. While permissable power input per unit of hearth area will vary to some extent with variations in the analysis of the ore within the specified ranges, it has been found that a refractory, such as magnesite, carbon, etc., in contact with the slag will be eroded if the power input is higher than about 27 kilowatts per square foot of hearth area. If too low a power input per unit of hearth area is employed, slag will freeze on the refractory furnace wall, thereby diminishing the effective hearth area and increasing the power input per unit of effective hearth area until an equilibrium is reached at which the effective hearth area becomes fixed. A preferred power input is about 23 kilowatts per square foot of effective hearth area.

The proper relationship among voltage drop from electrode to furnace hearth, current per electrode, and electrode diameter is essential to satisfactory arc-resistance smelting wherein the electrode tips are maintained out of contact with the slag but close enough to the slag surface to maintain very short arcs between the electrode tips and the slag surface. This relationship among these variables is expressed as the electrode periphery resistance R in the equation $$R \text{ equals } \frac{E}{I} \text{ times } 3.1416 \text{ times } D$$

where R equals ohm-inches, E equals the potential drop from electrode to hearth in volts, I equals current per electrode in amperes and D equals electrode diameter in inches. It has been found that satisfactory operation is had when R is within the range of 1.3 to 2.7 ohm-inches and preferably, about 2.2 ohm-inches. This range is based upon use of artificial graphite electrodes, and the range with use of carbon electrodes may be somewhat higher.

It is desirable that the ore in the charge mixture be crushed to pass through a screen with ¾ inch, preferably ½ inch, openings. A large proportion of finely divided material in the crushed ore is not objectionable and, in fact, is desirable. It is beneficial for the crushed ore to have a good distribution of particles in sizes ranging from the maximum down to less than 100 mesh. If the ore does not contain sufficient natural fines, it should be crushed to finer size so that at least 40 percent is minus 10 mesh.

Usual carbon reductants, such as coal, coke or charcoal, may be employed. It is desirable, however, to select the available form of carbon of the lowest sulfur content in the interest of producing ferro-nickel of low sulfur content. The carbon reductant, because of the small proportion of reductant in the charge, should be of small enough particle size for uniform distribution throughout the charge. Best results have been obtained with a carbon reductant crushed to minus ¼ inch size and containing all the finer sizes produced during crushing.

Metallic reductants may be used instead of carbon or in conjunction with carbon. Metals for this purpose must have a greater affinity for oxygen than have the nickel, cobalt and copper to be reduced. Examples of metallic reductants are aluminum, silicon, manganese and combinations thereof, usually in the form of a ferroalloy, such as ferrosilicon and aluminum ferrosilicon. Because of the extremely small relative volume of metallic reductant employed and because such reductants react essentially with metal oxides contained in the molten slag, any metallic reductant employed should be of small enough particle size, say minus 65-mesh, for uniform distribution throughout the charge mixture.

A ratio of silica to magnesia in the charge mixture between 1.5 to 1 and 2.5 to 1, and preferably about 2 to 1, is necessary for a satisfactory smelting operation and for production of a slag that will not attack the refractory furnace lining under the other conditions of the process. Lime results in an unsatisfactory operation and promotes attack of the magnesite refractory by the resulting slag.

The invention is illustrated further by the following examples

*Example 1*

The furnace used in this run was of rectangular cross section measuring 24 by 48 inches within the magnesite lining. It was equipped with three graphite electrodes of 5⅛ inch diameter arranged in line. The electrodes were automatically regulated. The furnace was backed by a 250 kva., three phase transformer. Tap holes were arranged for periodic tapping of slag alone and the slag and metal together.

The ore used analyzed 2.87 percent nickel, 13.7 percent iron, 0.065 percent cobalt, 0.095 percent sulfur, 0.007 percent phosphorus, 40.3 percent silica, 20.3 percent magnesia, 3.7 percent alumina and no calcium oxide. This ore was dried and crushed to minus ¾ inch particle size. The reductant used was charcoal and ferrosilicon, the charcoal being minus ¼ inch size and analyzing 67.8 percent fixed carbon and the ferrosilicon being minus 65 mesh and analyzing 72.3 percent silicon. No flux was used.

Individual charge mixtures each comprising 300 pounds of ore, 4 pounds and 11 ounces of charcoal and 5 pounds and 4 ounces of ferrosilicon were thoroughly mixed and fed more or less continuously into the furnace with the charge banked against the furnace walls and sloping toward the electrodes, beneath which the molten bath was essentially bare. The slag and metal products were tapped from the furnace at periodic intervals. Over a period of 45.6 hours of continuous operation, a total of 12,160 pounds of ore, 205.8 pounds of ferrosilicon and 190.6 pounds of charcoal was fed into the furnace. There were produced 677.2 pounds of ferronickel and 9711 pounds of slag. The average analysis of the ferronickel was 43.6 percent nickel, 56.0 percent iron, 1.16 percent cobalt, 0.081 percent sulfur, 0.038 percent phosphorus, 0.010 percent carbon and 0.026 percent silicon. The average analysis of the slag produced was 0.27 percent nickel, 12.1 percent iron, 0.020 percent cobalt, 52.0 percent silica and 27.4 percent magnesia. The ferronickel product contained 84.6 percent of the nickel present in the ore without allowing for losses to the refractories and unfinished products.

The average power input for the entire test was 145 kilowatts at an average electrode to hearth voltage drop of 90 volts and a calculated average current per electrode of 541 amperes. During the course of the test slag froze on the magnesite lining in an amount that reduced the effective hearth area to 6.3 square feet. At 145 kilowatts and 6.3 square feet of effective hearth area, the average power input was 23 kilowatts per square foot. Based upon the above average voltage and current figures and the electrode diameter of 5⅛ inches, the average electrode periphery resistance R equalled 2.68 ohm-inches.

*Example 2*

In this run, a furnace having a magnesite lining and a circular hearth having an area of 14.7 square feet and two top graphite electrodes of 8 inch diameter was used. The ore used in this run contained 2.22 percent nickel and the ratio of silica to magnesia therein was 1.98. The total charge mixture fed into the furnace more or less continuously over a period of 247.55 hours consisted of 80,047 pounds of ore, 1412 pounds of charcoal containing 80.3 percent fixed carbon and 567 pounds of ferrosilicon containing 72.7 percent silicon. The products obtained were 3264 pounds of ferronickel having an average nickel content of 50.32 percent and a slag having an average nickel content of 0.20 percent. The nickel recovery in the ferronickel was 92.7 percent of the nickel in the ore smelted.

The average power input was 169 kilowatts at an average electrode to hearth voltage drop of 89 volts and a calculated average current per electrode of 950 amperes. During the course of the run slag froze on the magnesite lining. At the 169 kilowatts, the average power input was 11.5 kilowatts per square foot calculated upon the basis of the original hearth area of 14.7 square feet. It was not possible to calculate the average power input on the basis of the effective hearth area because of the irregular contour of the surface of the frozen slag coating on the furnace lining. However, the actual average power input based upon the effective hearth area would be greater than the 11.5 figure indicated above. Based upon the average voltage and current figures and the electrode diameter of 8 inches, the average electrode periphery resistance R equalled 2.35 ohm-inches.

*Example 3*

In another run using 74,250 pounds of ore having a composition within the previously specified ranges of components and having a nickel grade similar to the ore used in Examples 1 and 2, and using only carbon reductant in the form of charcoal, and without flux, 3178.5 pounds of ferronickel averaging 51.6 percent nickel and 52,059 pounds of slag averaging 0.29 percent nickel were produced. The ratio of silica to magnesia in this ore was within the previously specified range of ratios. The average power input was less than 27 kilowatts per square foot of hearth area. The average electrode periphery resistance R was within the previously specified range.

We claim:

1. The method of smelting which comprises feeding into an electric arc furnace having at least two electrodes an intimate charge mixture consisting of a reducing agent and an oxidized material comprising by weight on the dry basis about 8 to 20 percent iron present as oxide, about 30 to 50 percent silica, about 10 to 30 percent magnesia, not more than about 5 percent alumina, from about 0 to 0.6 percent copper, not more than about 4 percent calcium oxide and from about 1 to 7 percent of a metal present as oxide and selected from the group consisting of nickel, cobalt, copper and mixtures thereof, the ratio of silica to magnesia in said charge mixture being between about 1.5 to 1 and about 2.5 to 1, the amount of reducing agent in said charge mixture being about equal to the stoichiometric amount required to reduce to metal all of said metal oxide and a desired amount of iron oxide, maintaining the power input at not greater than about 27 kilowatts per square foot of hearth area, and maintaining the electrode periphery resistance R within the range from about 1.3 to 2.7 ohm-inches as computed by the formula $$R \text{ equals } \frac{E}{I} \text{ times } 3.1416 \text{ times } D$$

where E equals the potential drop from electrode to hearth in volts, and I equals current per electrode in amperes and D equals electrode diameter in inches.

2. The method as described by claim 1 wherein the charge mixture is fed into the furnace to form a bank on the furnace wall sloping downward toward an electrode and out of contact with the latter.

3. The method as described by claim 1 wherein said power input is about 23 kilowatts per square foot of effective hearth area.

4. The method as described by claim 1 wherein said electrode periphery resistance R is maintained at about 2.2 inch-ohms.

References Cited in the file of this patent

UNITED STATES PATENTS

| | | |
|---|---|---|
| 909,667 | Price | Jan. 12, 1909 |
| 1,727,482 | Moore | Sept. 10, 1929 |
| 2,573,153 | Lichty | Oct. 30, 1951 |
| 2,653,868 | Lichty | Sept. 29, 1953 |
| 2,674,531 | Udy | Apr. 6, 1954 |